US006766993B2

(12) United States Patent
Rasmussen et al.

(10) Patent No.: US 6,766,993 B2
(45) Date of Patent: Jul. 27, 2004

(54) CLAMP FOR CONNECTING A CYLINDRICAL TEMPERATURE SENSOR AXIS-PARALLEL TO A TUBE

(75) Inventors: Jens Erik Rasmussen, Graasten (DK); Børge Skov Hansen, Nordborg (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 10/405,868

(22) Filed: Apr. 2, 2003

(65) Prior Publication Data

US 2003/0189139 A1 Oct. 9, 2003

(30) Foreign Application Priority Data

Apr. 4, 2002 (DE) ......................................... 102 14 966

(51) Int. Cl.[7] .................................................. A47K 1/08
(52) U.S. Cl. ................... 248/313; 24/274 R; 248/230.9
(58) Field of Search .............. 248/68.1, 74.3, 248/74.4, 74.1, 69, 229.17, 230.9, 313, 316.1; 24/279, 274 R, 281; 138/99

(56) References Cited

U.S. PATENT DOCUMENTS

| 1,584,498 | A |   | 5/1926  | Vitek              |
| 2,650,404 | A |   | 9/1953  | Dalpiaz            |
| 2,863,203 | A |   | 12/1958 | Dalpiaz            |
| 3,317,974 | A | * | 5/1967  | Sister ........................... 24/279 |
| 3,750,241 | A | * | 8/1973  | Bootha ......................... 24/279 |
| 3,817,053 | A |   | 6/1974  | Orth               |
| 3,869,872 | A |   | 3/1975  | Webber             |
| 3,879,811 | A | * | 4/1975  | Leverton ...................... 24/281 |
| 3,880,106 | A | * | 4/1975  | Farmer ........................ 440/113 |
| 4,467,613 | A |   | 8/1984  | Behr et al.        |
| 4,889,167 | A | * | 12/1989 | Morris .......................... 138/99 |
| 4,993,124 | A | * | 2/1991  | Ouimet ....................... 24/274 R |
| 5,497,973 | A | * | 3/1996  | Balzen et al. ................ 248/551 |
| 6,095,784 | A | * | 8/2000  | Wickizer ....................... 425/11 |
| 6,158,094 | A | * | 12/2000 | Clanin ....................... 24/274 R |
| 6,254,052 | B1| * | 7/2001  | Hubbard et al. ............ 248/313 |
| 6,594,869 | B1| * | 7/2003  | Chen ......................... 24/274 R |

FOREIGN PATENT DOCUMENTS

| FR | 497718 | 12/1919 |
| FR | 549701 | 2/1923  |

* cited by examiner

Primary Examiner—Leslie A. Braun
Assistant Examiner—Tan Le
(74) Attorney, Agent, or Firm—McCormick, Paulding & Huber LLP

(57) ABSTRACT

A clamp for connecting a cylindrical temperature sensor axis-parallel with a tube has a bendable metallic tension band which tension band on its one end portion has a first jaw and at its other end section is shapewise connectable with a second jaw, and which clamp also has a tension screw. The tension screw is inserted through a bore in the first jaw and is threaded through a threaded bore in the second jaw. To be able to connect the sensor and tube rigidly with little heat transfer resistance the second jaw has a bent plate with two legs. The first leg is provided with the threaded bore and the second leg with a slot through which the other end section can be passed. The tension band length is so chosen that the other end section after the wrapping of the tension band around the temperature sensor and the tube as well as its being passed through the slot is bendable down onto the second leg. The tension screw length is so chosen that after its tightening it lies on the bent down end section.

7 Claims, 3 Drawing Sheets

CLAMP FOR CONNECTING A CYLINDRICAL TEMPERATURE SENSOR AXIS-PARALLEL TO A TUBE

CROSS-REFERENCE TO RELATED APPLICATIONS

This application is entitled to the benefit of and incorporates by reference essential subject matter disclosed in German Patent Application No. 102 14 966.6 filed on Apr. 4, 2002.

FIELD OF THE INVENTION

The invention concerns a clamp for connecting a cylindrical temperature sensor axis-parallel to a tube with co-engagement of the temperature sensor and the tube, the clamp having a bendable metal tension band, which band has a first jaw at a first end section, a second jaw shapewise connectable with a second end section of the tension band, and which clamp also includes a tension screw, wherein the tension screw extends through a bore in the first jaw and is threaded through a threaded bore in the second jaw.

BACKGROUND OF THE INVENTION

In a known clamp of this type (U.S. Pat. No. 2,863,203) the second jaw has a plate shaped nut. The second end section of the tension band is provided with a plurality of hole pairs spaced from one another in the longitudinal direction of the tension band. The nut has two bosses which can be received in a hole pair suiting the diameters of the involved temperature sensor and tube, and accordingly corresponding to the required effective length of the tension band, to shapewise connect the tension band with the nut. Additionally, a longitudinal slot is formed in the tension band through which the tension screw can be inserted. The holes as well as the slot in the tension band create a weakening of the tension band. Therefore, the tension force exertable by the tension band is limited and relatively low. In many cases only a linear engagement between the temperature sensor and the tube is possible, and as a rule even only a point contact is possible since the tube and/or the sensor housing often in transport or because of uncareful handling is so deformed that they are no longer both of cylindrical shape. Therefore, the heat transfer resistance between the temperature sensor and the tube is relatively high.

The invention has as its object the provision of a clamp of the above-mentioned kind which makes possible the exertion of a high-tension force and which thereby makes possible the achievement of a low heat transfer resistance between the tube and the temperature sensor.

SUMMARY OF THE INVENTION

In accordance with the invention, this object is achieved in that the second jaw has a bent plate with a first leg and with a second leg perpendicular to the first leg, that the first leg is provided with a threaded bore and the second leg with a slot for passage therethrough of the second end section of the tension band, that the length of the tension band is so chosen that the second end section after the wrapping of the tension band around the temperature sensor and the tube as well as after its passage through the slot is bendable down onto the second leg, and that the length of the tension screw is so chosen that after its tightening it lies on the bent down second end section.

With this solution, the need for providing a slot in the tension band and of holes in its second end section is avoided. At least one of the two parts to be connected can thereby be at least so far deformed that a surface area engagement between the temperature sensor and the tube is achieved. Accordingly, a low heat transfer resistance between the two parts can be obtained.

Preferably, the first jaw has a plate which contains the bore, around which plate a first end section is bent so that it lies against both faces of the plate, and that the first end section on both sides of the plate is provided with a hole, with the hole being aligned with the bore. While in the known clamp a first jaw is formed by the bending of the end section onto itself and by the forming of two holes aligned with one another in the tension band for receiving the tension screw, so that the holes are subjected to a high hole bearing pressure by the shaft of the tension screw and as a result become enlarged or even torn, in the case of the construction according to the invention the first jaw is in the form of a plate surrounded by the first end section of the tension band and takes on the main load upon tightening. The wrapping of the end section around at least two edges of the plate in itself already provides a very secure shapewise connection. The holes in the end section are thus loaded to only a small degree. By these measures all together a yet higher load capacity of the clamp is obtained.

The tension band can moreover be made of copper which has a high heat conductivity and is also significantly corrosion resistant.

Then the first leg which is bent nearly or substantially perpendicularly to the second jaw can have a bushing which lengthens its threaded bore. The second jaw can, therefore, be made to be relatively thin with the threads of the threaded bore nevertheless being able to carry a high load.

Further, the second leg can have a step in the form of a two-stage bend between the first leg and the slot, which step in reference to the inner side of the tension band extends outwardly by an amount which corresponds to the thickness of the tension band. The jaw can therefore in the area between the first leg and the slot be supported by the corresponding portion of the part to be connected. Thereby, a danger of a bending of the first leg is diminished.

Still further, it can be provided that the threaded shank of the tension screw has a thread free neck and that the bore in the first jaw is provided with threads. The tension screw is then secured at its thread free neck by the surrounding threaded bore of the first jaw in its installed position in the jaw before the assembly of the clamp.

If the tension screw has a cutting thread, it itself can cut the thread in the threaded bore.

BRIEF DESCRIPTION OF THE DRAWINGS

The invention and its further developments are described in the following, in conjunction with the accompanying drawings, by way of a preferred exemplary embodiment. The drawings are.

DETAILED DESCRIPTION OF THE PREFERRED EMBODIMENTS

The illustrated clamp serves for the connection of a cylindrical temperature sensor 1 of an expansion valve, of a refrigeration system or of a cooling mechanism, with a tube 2 at the output of the evaporator of the refrigeration system or cooling mechanism, with the temperature sensor 1 and the tube 2 being in axis-parallel co-engagement with one another.

Figure 2:
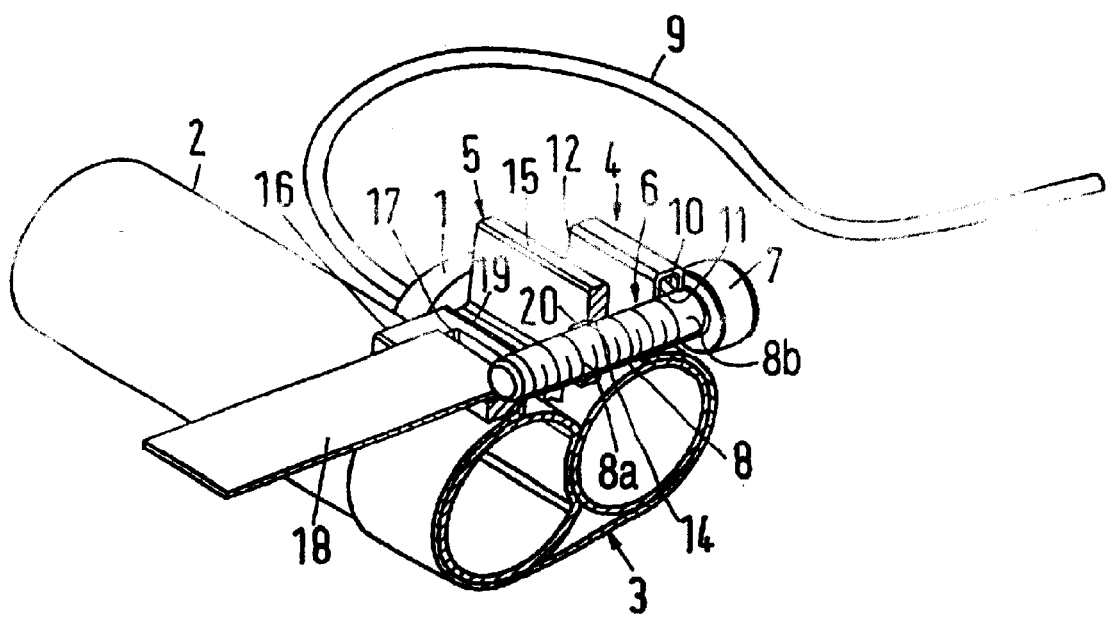

The illustrated clamp consists of a bendable tension band 3 of metal, preferably copper, a first jaw 4, a second jaw 5 in the form of a stiff plate of metal bent at an angle of about 90°, and a tension screw 6 with a head 7 and a threaded shank 8. The threaded shank 8 includes threads 8a and a thread-free neck 8b as shown in FIG. 2.

The temperature sensor 1 is connected with the expansion valve (not shown) by a capillary tube 9.

Figure 3:
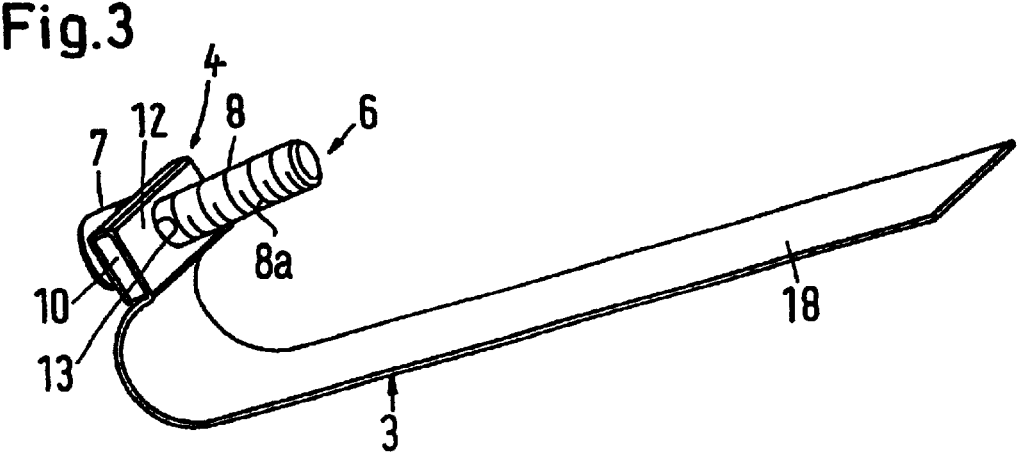

The jaw 4 includes a plate 10 with an unthreaded bore 11. A first end portion 12 of the tension band 3 is bent around the plate 10 so that it lies against both faces of the plate 10. The first end section 12 of the tension band 3 on both sides of the plate 10 has a hole 13 (FIG. 3). The holes 13 are aligned with the unthreaded bore 11 and have the same diameter as the bore 11, but they can also have a somewhat smaller or larger diameter than the bore 11.

Figure 1:
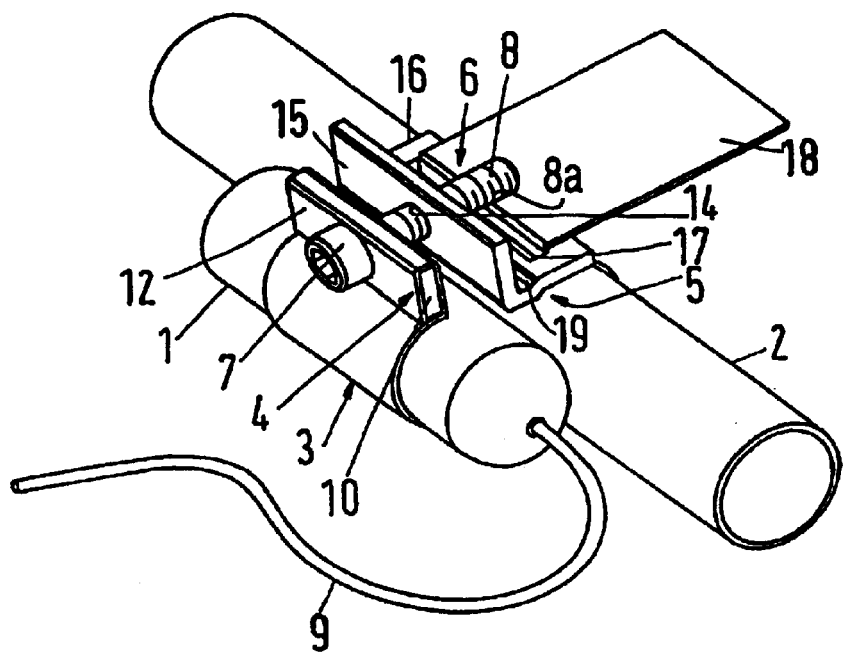
FIG. 1 a perspective illustration of a tube and a temperature sensor which are connected by a clamp embodying the invention, FIG. 2 a perspective illustration of the arrangement of FIG. 1, but as seen from another viewing angle and in cross-section, FIG. 3 a perspective illustration of a part of the clamp of FIG. 1 without the second jaw, FIG. 4 a perspective illustration of the same portion of the clamp of the invention as illustrated in FIG. 3, but as seen from a different viewing angle, and FIG. 5 a perspective illustration of a second jaw of the clamp of the invention.

The tension screw 6 is inserted by its threaded shank 8 through the unthreaded bore 11 and the holes 13 in the first jaw 4 and is screwed through the threaded bore 14 in the first leg 15 of the second jaw 5. The second leg 16 of the second jaw 5 has a slot 17 through which is guided the second end section 18 of the tension band 3. The length of the tension band 3 is so chosen that after the surrounding of the temperature sensor 1 and the tube 2 as well as the insertion of the tension band through the slot 17, the second end section 18 is bendable down onto the second leg 16, and the length of the tension screw 6 is so chosen that after its tightening it lies on the second end section 18. Therefore, the second end section 18 remains in the FIG. 1 position lying tightly on the leg 16, so that it does not bend back under the tension force. Moreover, the second leg 16 of the second jaw 5 has a step 19 in the form of a two-stage bend between the first leg 15 and the slot 17, which in reference to the inner side of the tension band 3 protrudes outwardly by an amount which corresponds to the thickness of the tension band 3. Also, the first leg 15 of the second jaw 5 is provided with a hole bushing 20 which axially lengthens the threaded hole 14 to increase the load bearing ability of the threads. Below the bushing or the threaded hole 14 the second jaw 5 in the area of its bend is provided with a hole 21, which inhibits the deformation of the threaded hole 14 by the bending of the two legs 15 and 16 so that they stand perpendicular to one another or at an angle of about 90°.

Figure 4:
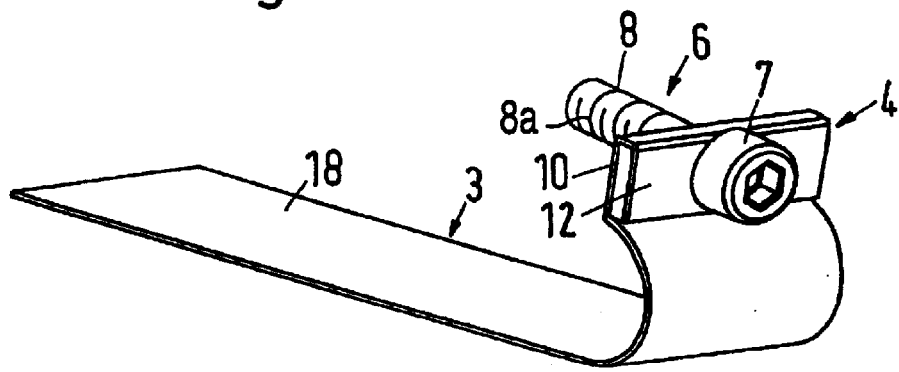

To connect the sensor 1 and the tube 2 with one another the tension band 3, which is bent around the plate 10 and provided with the tension screw 6 as in FIGS. 3 and 4, is bent around the sensor 1 and tube 2 and the end section 18 is so far inserted through the slot 17 and bent down onto the outer side of the leg 16, that the jaws 4,5 still have a spacing from one another. Then the tension screw 6 is threaded into the threaded bore 14 until the threaded shank 8 lies on the end section 18. Then the tension screw 6 is tightened. In doing this the tension force can be chosen to be so high that the sensor 1 presses lightly into the tube 2 as illustrated in FIG. 2, so that a large area of co-engagement between the sensor 1 and tube 2 is obtained. In this case the material of the tube 2 is softer than that of the sensor housing. Customarily, the tube 2 consists of cooper and the sensor housing of steel.

Figure 5:
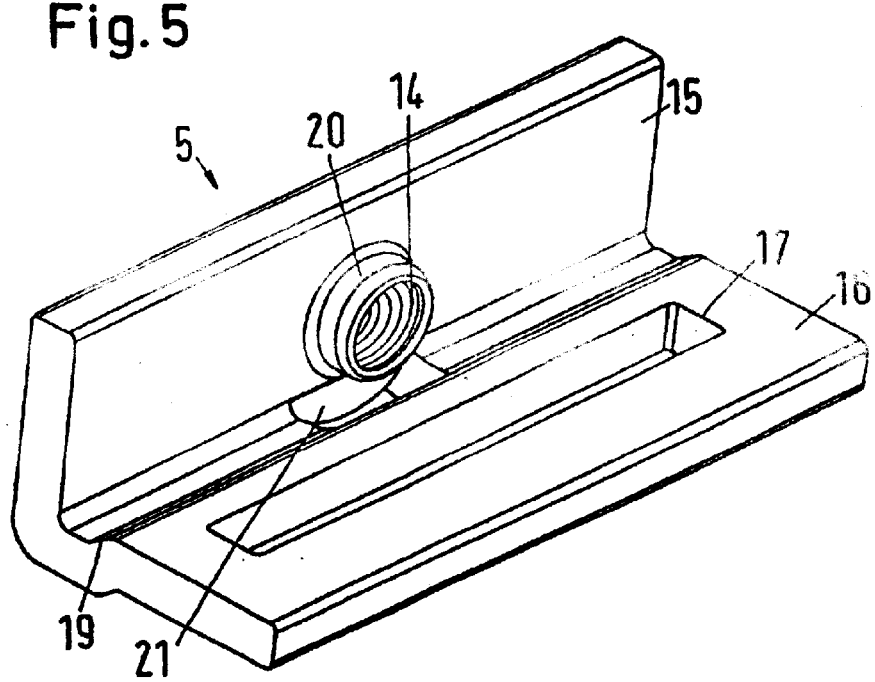
FIG. 5a a perspective illustration of another embodiment of the second jaw of the clamp and a tension screw therefore according to the present invention.
Figure 5A:
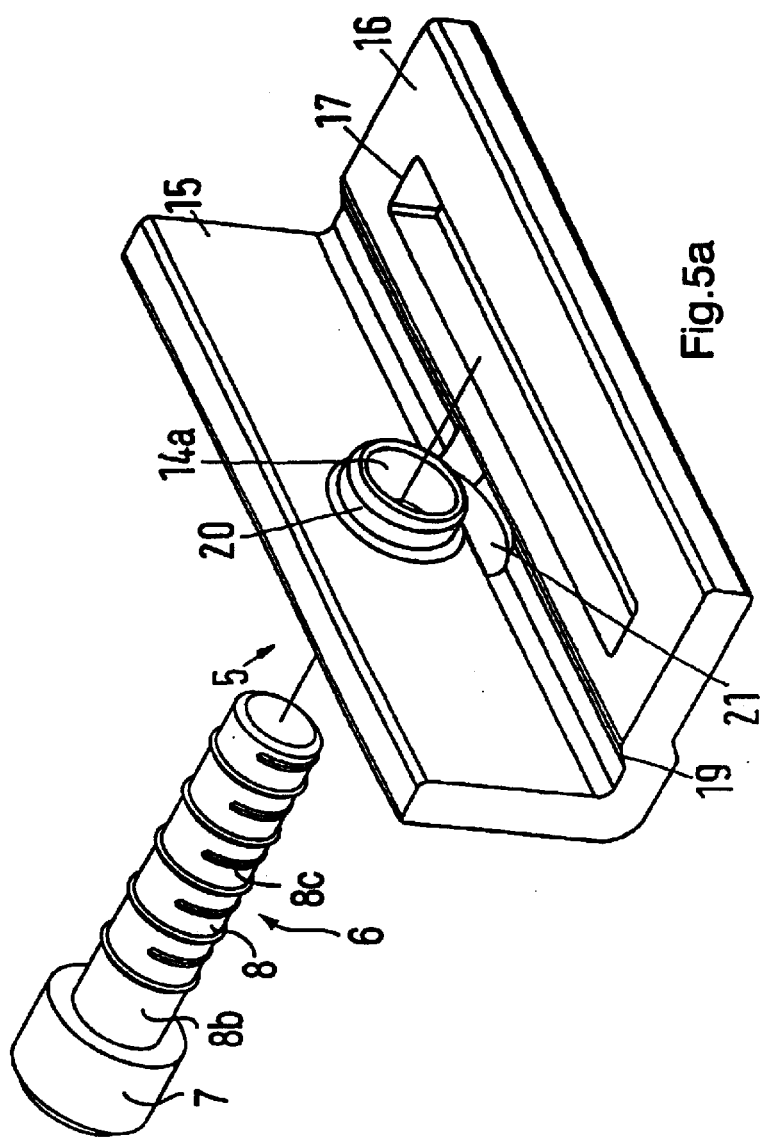

Alternatively, the tension screw 6 can during manufacture of the clamp be put into the position of FIGS. 3 and 4 before the tension band is inserted through the slot 17 in the jaw 5, with the tension screw being threaded into the threaded bore 14 of the jaw 5 only so far that the tension screw 6 does not yet cover the slot 17. In this preassembled condition, the clamp can be distributed and transported. At the final assembly location one then needs only to lay the tension band 3 around the sensor 1 and the tube 2, to insert the end section 18 through the slot 17 and to tighten the tension screw 4. This eases and simplifies the assembly at the final assembly location. In this case, to hold the tension screw 6 in the jaw 5 in the preassembled condition, the position of the tension screw in the threaded bore 14 up to the time of tightening can be secured before the end section 18 is inserted through the slot 17. This securing of the tension screw 6 in the preassembled condition of the clamp, in which the tension screw 6 extends only a short distance out of the threaded bore 14 up to the vicinity of the slot 17, can be achieved in that the tension screw 6 is formed with a cutting thread 8c and it is initially screwed into an as yet unthreaded bore 14a of the leg 15 up to its preassembled position thereby the threads are cut into the bore at the same time so as to produce the threaded hole 14 and which threads themselves lightly hold the tension screw 6 in fixed position until the tension screw is tightened at the final assembly location. FIG. 5a shows the tension screw 6 having cutting threads 8c on the threaded shank 8 thereof.

The tension force can be chosen to be very high without tearing the tension band or without deforming the jaws 4,5 or the hole 13 in the end section 12 or the threaded bore 14, because the tension force of the tension band 3 is mainly taken up by the 90° bending of the tension band at the edges of the plate 10 or at the slot 17 which engage the band, and the end sections 12 and 18 respectively engage the plate 10 and the leg 16 over large surface areas. The tension screw 6 provides an additional holding together of the connection between the end sections 12 and 18 on one hand and the plate 10 or jaw 5 on the other hand by its insertion in the hole 13 of the end section 12 and by its engagement with the end section 18.

The plate 10 is formed to be essentially thicker and stiffer than the tension band 3. The same also applies to the jaw 5. All parts of the clamp, with the exception of the tension band 3 consist of stainless steel. Between the temperature sensor 1 and the tube 2 a good heat transmissibility is obtained, because the temperature sensor 1 can be mounted to the tube very rigidly and with a large area of co-engagement.

Figure 6:
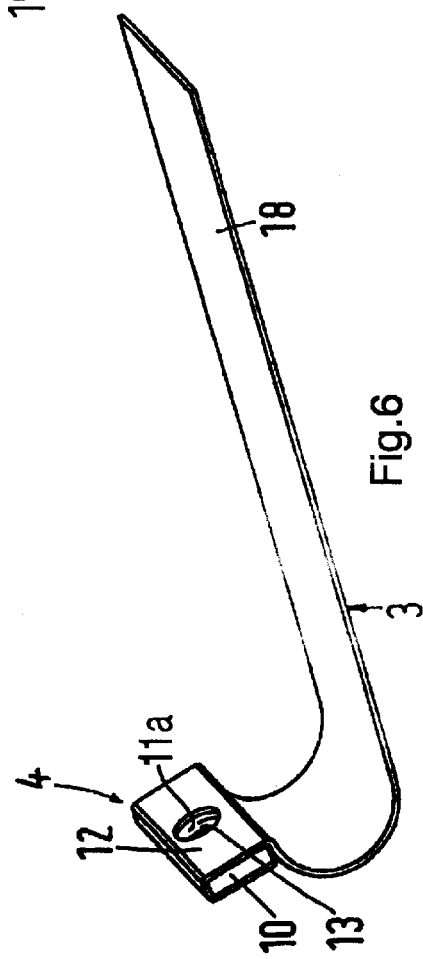
FIG. 6 a perspective view of another embodiment of a first jaw and a bendable band according to the present invention.

A further development can exist in that the bore 11a in the jaw 4 (FIG. 6) likewise is provided with a thread which corresponds to that of the tension screw 6. The tension screw 6 can then be provided with a thread-free neck 8b with a length corresponding to the thickness of the jaw 4. The position of the tension screw 6, as seen as in FIGS. 3 and 4, is then secured by the threads of the bore 11a, since the tension screw 6 must first be threaded out of the threads of the bore 11a which surround the thread-free 8b neck of the tension screw 6, in order to remove the tension screw from the jaw 4.

What is claimed is:

1. A clamp for connecting a cylindrical temperature sensor axis-parallel to a tube with co-engagement of the temperature sensor and the tube, with a bendable tension band of metal which at a first end section has a first jaw, a second jaw shapewise connectable with a second end section, and a tension screw, wherein the tension screw extends through a bore in the first jaw and through a threaded bore in the second jaw, characterized in that the second jaw has a bent plate with a first leg and a second leg standing perpendicularly to the first leg, that the first leg is provided with the threaded bore and the second leg is provided with a slot through which the second end section of the tension band can be passed, that the length of the tension band is so chosen that the second end section after laying of the tension band around the temperature sensor and the tube and its passage through the slot is bendable down onto the second leg, and that the length of the tension screw is so chosen that after its tightening its lies onto the bent down second end section.

2. A clamp according to claim 1, wherein the first jaw has a plate provided with the bore and around which plate the first end section is bent so that it lies against both faces of the plate, and that the first end section on both sides of the plate is provided with a hole, which hole aligns with the bore.

3. A clamp according to claim 1, wherein the tension band is made of copper.

4. A clamp according to claim 1, wherein the first leg has a bushing increasing the length of the threaded bore.

5. A clamp according to claim 1, wherein the second leg has a step in the form of a two-stage bending between it and the first leg and contains the slot, which step in reference to the inner side of the tension band protrudes outwardly by an amount corresponding to the thickness of the tension band.

6. A clamp according to claim 1, wherein the tension screw is provided with a threaded shank having a thread-free neck and the bore in the first jaw is provided with threads.

7. A clamp according to claim 1, further characterized in that the tension screw has a cutting thread.

* * * * *